(12) United States Patent
Tonev et al.

(10) Patent No.: US 9,952,483 B2
(45) Date of Patent: Apr. 24, 2018

(54) CUSTOMIZABLE ELASTIC COLLAR GRIP FOR ENHANCED MANUAL MANIPULATION OF CAMERA LENSES

(71) Applicants: BAND.IT. Co., Bradenton, FL (US); Thomas E. Bender, Bradenton, FL (US)

(72) Inventors: Elezar Tonev, Bradenton, FL (US); Christopher M. Cooper, Bradenton, FL (US); Domenic Aluise, Bradenton, FL (US); Jacob Barrineau, Lakewood Ranch, FL (US); Thomas E. Bender, Bradenton, FL (US)

(73) Assignee: BAND.IT.Co., Bradenton, FL (US)

( * ) Notice: Subject to any disclaimer, the term of this patent is extended or adjusted under 35 U.S.C. 154(b) by 9 days.

(21) Appl. No.: 15/337,076

(22) Filed: Oct. 28, 2016

(65) Prior Publication Data
US 2017/0123299 A1     May 4, 2017

Related U.S. Application Data

(60) Provisional application No. 62/247,735, filed on Oct. 28, 2015.

(51) Int. Cl.
| | |
|---|---|
| *G03B 11/00* | (2006.01) |
| *G03B 3/00* | (2006.01) |
| *G03B 5/00* | (2006.01) |
| *G03B 17/56* | (2006.01) |

(52) U.S. Cl.
CPC .............. *G03B 3/00* (2013.01); *G03B 5/00* (2013.01); *G03B 17/563* (2013.01); *G03B 2205/0046* (2013.01)

(58) Field of Classification Search
CPC ...... G03B 17/568; G03B 17/12; G03B 17/56; G03B 17/06; G03B 11/00; G03B 11/04; G03B 3/00; G02B 7/04; G02B 7/02; G02B 7/10; G02B 7/023; G02B 7/026
USPC ........ 396/544, 529; 359/701, 706, 822, 823, 359/825, 830
See application file for complete search history.

(56) References Cited

U.S. PATENT DOCUMENTS

2012/0069458 A1*  3/2012  Kurobe ................... G02B 7/04
                                                          359/822

* cited by examiner

*Primary Examiner* — Rodney Fuller
(74) *Attorney, Agent, or Firm* — Saliwanchik, Lloyd & Eisenschenk

(57) ABSTRACT

Advantageous collar grips are provided to secure a grip on a camera lens ring, such as the focusing, zooming, or aperture control rings. A collar grip of a pliable and stretchable material can be placed around the lens ring to allow improved manipulation and thereby more accurate manipulation of the lens. Extended surface features on the collar grip can secure it to the lens ring and ensure an accurate grasp. The collar grip also provides increased diameter to the focusing ring, which can further aid in more accurate focusing ability.

16 Claims, 10 Drawing Sheets

CUSTOMIZABLE ELASTIC COLLAR GRIP FOR ENHANCED MANUAL MANIPULATION OF CAMERA LENSES

CROSS-REFERENCE TO RELATED APPLICATION

This application claims the benefit of U.S. Provisional Application Ser. No. 62/247,735, filed Oct. 28, 2015, which is incorporated herein by reference in its entirety.

BACKGROUND OF THE INVENTION

Photography is a growing art form and has become more common with the advent of "point and click" cameras that automatically zoom and focus an image. Nonetheless, many photographers still prefer to use cameras with manually adjustable lenses because of the greater freedom afforded in capturing an image. Cameras with manual lenses allow the user to control such settings as the zoom and/or the focus of a lens. These types of cameras have one or more rings on the outside of the lens barrel that can be grasped and rotated to control the zoom, focus, or aperture settings of the camera. The ability to manipulate the focusing, zoom, or aperture settings using the rings on the lens barrel affects the quality of the picture. Some lens rings are narrow or have a smooth finish, which can make them difficult to rotate, and some lens rings can have hatching or other external features to assist in rotating. They are still often hard surfaces, with minimal traction. Lens ring collars can be attached to provide more control, but these tend to be rigid and bulky, can add weight to the camera, and take significant time to install. Lens ring collars are also usually not intended to improve actual grasping on the camera lens ring, and this necessitates a photographer learning and using an alternative technique for using the camera.

BRIEF SUMMARY

The subject invention successfully addresses the disadvantages associated with the previously known camera lens ring collars and their method of use, and provides certain attributes and advantages, which have not been realized by known devices. In particular, the subject invention provides novel embodiments of a collar grip that can be placed around a camera lens, particularly a focusing or zoom ring, to improve a user's grasp of the lens ring. A collar grip of an embodiment of the subject invention can also increase the outside diameter of the focusing ring, which can provide more precision and improve focusing ability. Advantageously, embodiments of the subject invention provide these improvements while still allowing a photographer to operate the focusing ring in the usual fashion and not change the methods by which they are accustomed to manipulating the camera.

A collar grip can be, in general, a ring, band, sleeve, tube, or similar shaped device of an elastic or other shape-memory material, so that it can be stretched to fit over the lens barrel and placed, for example, on the focusing or zoom ring of the lens. When released, a collar grip of an embodiment of the subject invention will retract, preferably instantaneously (or relatively instantaneously), to resume its original shape and conform to the outside configuration of the lens ring.

The lens ring on a lens barrel can be scored or hatched or have ribs, nibs, or other ergonomic structures to aid in grasping. This scoring or hatching is usually made directly in the material of the focusing ring, which is usually metal or plastic, with minimal pliability, which necessitates firmly grasping the focusing ring to achieve stiction or friction between the fingers and the lens ring. When making minute adjustments, which can require a light touch, this scoring or hatching usually provides minimal assistance.

In one embodiment, a collar grip of the subject invention has extended surface features, such as cogs or other protrusions on the exterior surface, against which the fingers of a user can make contact. In a further embodiment, the material of a collar grip is pliable or cushiony, so that it can conform to the user's grasp.

In a further embodiment, a collar grip of the subject invention also has extended surface features, such as ribs or other protrusions, on the interior surface that make contact with the lens barrel or focusing ring. The pliability of the material can beneficially allow the extended surface features to conform to the exterior of the focusing ring and can produce cohesion or stiction with the focusing ring or other part of the camera lens, creating a non-permanent bond that allows the collar grip to stay in place during use.

The ability to accurately focus and/or zoom a lens is related to the amount of control and precision that a user has in rotating the focusing ring. Collar grips of embodiments of the subject invention can have a material thickness that, when placed around a lens ring, effectively increases the diameter of the ring. This increased diameter, provided by the thickness of the collar grip, increases the radius between the user's fingers and the center of the camera lens, causing a larger amount of movement to be required to generate the same motion in the lens. This increased distance can provide more precise control over the focus and zoom of the camera lens, as the same adjustment in terms of the distance rotated (i.e., arc-distance) yields a smaller change in terms of degrees of rotation as compared to the current stock zoom and focus manual adjustment rings. A greater error factor is therefore provided by increasing the distance required to make minute adjustments in focusing and zooming, allowing incremental changes to be made with larger movements.

Camera lenses are available in a large variety of focal lengths. The focal length can determine the maximum and minimum longitudinal lengths of the lens, which are the distances from where the lens connects to a camera body to the maximum and minimum distances, respectively, from the camera body that the lens can extend. Camera lenses typically have at least one lens ring that is used to adjust both the focus and/or zoom of a lens. Shorter focal length lenses can have narrower lens rings because they may be shorter than a lens with a longer focal length. Collar grips of embodiments of the subject invention can be customizable to fit a particular width of lens ring to accommodate different focal length lenses. In one embodiment, the height of a collar grip, which is the distance between the edges of the collar grip, can be changed, adjusted, or altered by removing or cutting away material from an edge of the collar grip. A collar grip can also have guides or tracks around the periphery that can assist in detecting where the fingers are located on the camera lens. If the collar grip is too large for a particular lens, the tracks can be used as guides for removing the correct amount of material to provide the desired collar grip height.

Preferably, a collar grip can be made of one or more materials that allow the collar grip to be stretched sufficiently to go over or around the camera barrel and be placed where desired. When released, the collar grip can be in the desired location on the lens with minimal or no further adjustment. Thus, the collar grip does not have to be or can be minimally adjusted by rolling, pushing, or pulling across the outside of the lens barrel in order to place it where intended. This can be helpful if there are other features or structures on the lens that would inhibit such method of placement. The pliability of the material can, however, allow this as a possible method of placement, if stretching the collar grip diameter to go around and over the lens is not desired or feasible.

A further advantage of collar grips of embodiments of the subject invention is the added safety and protection that can be provided. A collar grip can inhibit the degradation of the camera lens, as it can protect the components that undergo motion (e.g., the focus and zoom rings) from particles like sand and dust that can cause wear. Embodiments of the subject invention can also inhibit liquids and oil from corroding the lens, which is inherently prone to rapid decay through regular use, exposure to oils on the hands and body, and by exposure to natural elements.

Materials that can be utilized for collar grips of embodiments of the subject invention can inhibit degradation by UV radiation, as the materials, such as different polymers, can be made UV resistant. This can further lengthen the effective life of the camera lens and the collar grip. The materials used can also be more effective at wicking moisture than the material of the lens ring, allowing a user to more effectively control the zoom and/or focus lenses under humid conditions. The materials used can also be more pliable than the material of the lens barrel, lens rings, or collar rings known in the art, and this can result in an increase in grasp-ability. The pliability of the material can also allow the lens to be braced or abutted against objects and provide sufficient buffering or cushioning to inhibit the camera shutter from moving the camera. This can prevent blurry shots from occurring when the camera lens is braced against objects during operation due to the shock absorption provided by embodiments of the subject invention. Furthermore, a collar grip does not have to be utilized only on a lens ring. The collar grip embodiments of the subject invention can be used on other areas of a lens barrel to provide the same protection and attributes as described above.

Collar grips of embodiments of the subject invention provide advantages and improvements that are not realized with current lens barrels or camera lens rings. They can be easy to install and do not interfere with, and can enhance, operation of the camera and focusing or zooming ability. They allow users to operate the camera lens rings normally and do not require changing the method of operation or use of a lens ring. In many embodiments, the materials utilized for a collar grip can impart customizable sizes, increased protection, and easy placement on a lens barrel.

BRIEF DESCRIPTION OF THE DRAWINGS

The drawings presented herein may or may not be drawn to scale and any reference to dimensions in the drawings or the following description is specific to the embodiments disclosed. Any variations of these dimensions that will allow embodiments of the subject invention to function for its intended purpose are considered to be within the scope of the subject invention. Thus, understanding that these drawings depict only embodiments of the invention and are not to be considered as limiting in scope, the invention will be described and explained with additional specificity and detail through the use of the accompanying drawings.

DETAILED DESCRIPTION

Figure 1:
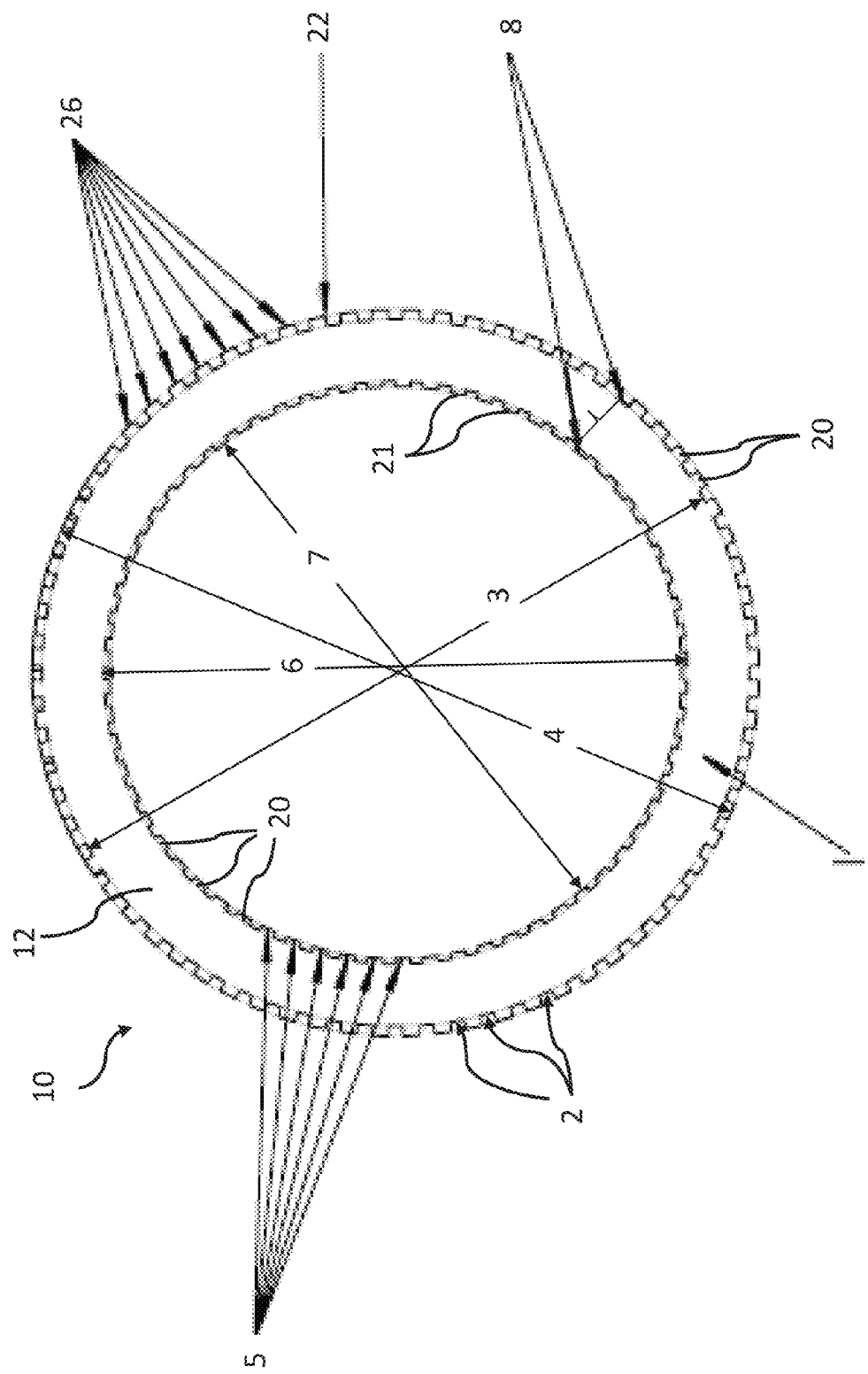
FIG. 1 is a front edge plan view of an embodiment of the subject invention.

The subject invention pertains to devices and methods for use in improving manipulation of a camera lens and, thus, a user's focusing ability thereof. Embodiments of the subject invention provide collar grips, or similar devices, which can be placed around a lens barrel (e.g., around a focusing ring on a lens barrel), without inhibiting or altering the operation of the lens.

Embodiments of the subject invention are useful in the field of lens optics, in particular, focusing and zoom lenses used on cameras, including, but not limited to cameras used for still photography, video, or television. A person with skill in the art will be able to recognize numerous other uses that would be applicable to the devices and methods of embodiments of the subject invention. Thus, while many of the terms herein relate to a use for lenses used on cameras, other modifications apparent to a person with skill in the art and having benefit of the subject disclosure are contemplated to be within the scope of the present invention.

As used herein, the term "camera" refers to any device capable of obtaining an image utilizing one or more lenses. This includes, but is not limited to, cameras for taking still images, video cameras, television cameras, digital cameras, manually operated cameras, hand-held or stand-alone cameras, and the like. It should be understood that the embodiments described herein can be used on a camera lens, which is not necessarily attached to a camera.

The terms "lens", "lens barrel," or "camera lens" as used herein can include lenses used for focusing, lenses used for zooming, lenses used to control aperture settings, lenses for special effects, interchangeable lenses, stock lenses, and other types of lenses, or combinations thereof. These terms, as used herein, can include standard or "stock" zoom and focus manual adjustment lenses, collars, particularly the outer casing thereof, having all of the controls for the lens. While embodiments of the subject invention are useful for improving the usability of standard or stock zoom and focus manual adjustment collars that come pre-installed on cameras, they are not precluded from use on other types of lenses or lens barrels. Embodiments of the subject invention are intended to be useful on any type of camera lens or lens barrel in which manual adjustment is or can be employed.

The term "stock collar" and "lens ring" are used interchangeably herein and for literary convenience. These terms are used to refer to a stock or standard focusing, zooming, and aperture rings on a lens. It can also refer to other rings on a lens barrel used for other purposes As used herein, and unless otherwise specifically stated, the terms "operable communication," "operable connection," "operably connected," "cooperatively engaged" and grammatical variations thereof mean that the particular elements are connected in such a way that they cooperate to achieve their intended function or functions. The "connection" or "engagement" may be direct, or indirect, physical or remote.

Reference is made throughout the application to the "interior surface" and "exterior surface" of the embodiments of the subject invention. As used herein, the interior surface is the surface that contacts or that makes operable connection with the lens barrel. Also as used herein, the exterior surface is the surface that, when installed, is located furthest (e.g., in a radial direction) from the lens barrel and with which a user makes operable connection to control the operation of the lens barrel, such as rotating the lens barrel or sliding the lens barrel.

Reference will be made to the attached figures on which the same reference numerals are used throughout to indicate the same or similar components. With reference to the attached figures, which show certain embodiments of the subject invention, it can be seen that embodiments of the subject invention can include a collar grip 10 configured as a sleeve, band, tube, or ring of continuous, uninterrupted material. The collar grip 10 can have two edges, referred to as the first edge 12 and the second edge 14, which are on the outside of the front and back of the collar grip. There can also be an exterior surface 2 that can have extended surface features 20 thereon. There can also be an interior surface 5 that can have extended surface features 20 thereon. As will be discussed in detail, the extended surface features, such as, for example, cogs and ribs, can be generally offset from each other on each surface, so that when viewed from one edge, the extended surface features on one surface appear to be between the extended surface features on the other surface, or at least appear not be aligned with one above the other. Alternatively, the extended surface features can be generally aligned with each other on each surface.

Advantageously, a collar grip 10 can be manufactured from one or more materials that allow for easy and accurate customization of the collar grip to fit specific lens sizes. In some embodiments, one or more horizontal tracks 80, which can both improve a user's grasp on the collar grip and provide a guide when customizing the collar grip, can be included. The extended surface features can also be formed with a draft or at an angle so as to increase contact and grasp-ability of the collar grip. Each of these above-mentioned general components can have one or more sub-components, which will be discussed in detail below.

In many embodiments of the subject invention, a pliable, customizable collar grip 10 is provided that can improve the ability to rotate or otherwise manipulate a camera lens' stock zoom and focus manual adjustment focusing rings. The material that can be utilized for the collar grip can be elastic or have shape-memory characteristics that allow a collar grip to be pulled, stretched, or otherwise temporarily deformed from the original shape and resume the original shape when released. In one embodiment, the diameter of the interior surface of the collar grip is smaller than a stock collar, until force is applied to temporarily deform the collar grip. While stretched or deformed, a collar grip can be slid over a lens barrel and placed over the stock collar for a zoom and/or focus manual adjustment ring of the camera lens. When released around a stock collar on a lens barrel, the collar grip can conform to the shape of stock collar as it returns to the natural or original form. In one embodiment, the material of the collar grip creates a seamless adhesion around the stock collar. In many embodiments, the material of a collar grip will produce cohesion or stiction between the stock collar and the collar grip, creating a strong non-permanent bond between the two that allows the collar grip to stay in place on the stock collar.

In one embodiment, the material utilized for a collar grip 10 is an elastomer of natural or synthetic polymer having elastic properties. In a further embodiment, the material of the collar grip is silicone. In a specific embodiment, the material of a collar grip is a Platinum 25 silicone, such as, for example, PlatSil® or Rebound®. This material can be platinum-based or be platinum-cured in an injection molding process. The material can also be formed in a heat-cured injection molding process. The final product can have a durometer of from 5 to 60 on one of the following scales: Shore A, Shore B, Shore C, Shore D, Shore DO, Shore O, Shore OO, or Shore M. For example, the final product can have a durometer of 10 to 20 or approximately 10 to 20 on a Shore A hardness scale. This can provide optimum grasp-ability and sufficient elasticity. A person with skill in the art will understand and be aware of other materials that can be used and the embodiments of a collar grip are not limited to only those mentioned above. Numerous elastomer materials are available and provide the advantage of increased drop or impact protection for a lens. The pliability of polymer materials, particularly silicone polymers, provide a reliable cohesion to create a no-slip bond between a collar grip and a stock collar or lens ring, allowing precise control of focus and zoom of a lens at all times.

Related art focus and zoom ring collars can be bulky and heavy, adding significant weight to a camera. They can also require a user to change the method by which the lens ring is rotated. In some situations, the addition of a handle or other protrusion for grasping and rotating a lens ring is desirable or necessary. In other situations, being able to more accurately and reliably grasp and rotate a lens ring in the normal fashion can be preferable. Collar grips of embodiments of the subject invention provide the advantage of being able to improve a user's grasp or grip on a stock collar and increase precision in focusing, without changing the mode of operation. The materials that can be utilized for collar grips of embodiments of the subject invention also provide the advantage of being lightweight, thus adding minimal weight to the camera, compared to other known devices.

In one embodiment, a collar grip has a weight in a range of from 2 ounces (oz) to 5 oz. In a further embodiment, a collar grip has a weight in a range of from 2.2 oz to 3 oz. In a particular embodiment, a collar grip has a weight of 2.5 oz or approximately 2.5 oz.

Elastomer materials can provide other benefits, such as their ability to inhibit or neutralize static charge in the lens and the camera. Elastomers can also be colored or tinted to increase visibility or to impart other desirable visual characteristics. They can also be made resistant to various levels of UV radiation.

Collar grips 10 of embodiments of the subject invention can inhibit degradation of the camera lens, as they can protect the components that undergo motion (focusing and zoom rings) from particles like sand and dust. They can also inhibit liquids or body oils from corroding the stock collar and camera lens, which are known to be prone to degradation through regular use and exposure to natural elements. A collar grip 10 can be more effective at wicking away moisture than the materials typically utilized for a stock collar on a lens barrel. This allows the user to more effectively control the zoom and focus of their camera under humid conditions. Further, when formed of the elastomer materials, a collar grip can allow the camera lens to be braced against other objects, with the collar grip 10 acting as the contact point. This can provide sufficient friction and shock absorption to inhibit the camera shutter from moving the camera.

A collar grip 10 can be fitted to a stock collar by stretching the collar grip at least partially out of shape or to, at least temporarily, have a larger interior surface diameter 6, as depicted in FIG. 1. In one embodiment, the material utilized for a collar grip permits the interior surface diameter 6 to be increased by an amount in a range of from 50% to 600% beyond the original dimension. In a further embodiment, the material utilized for a collar grip permits the interior surface diameter 6 to be stretched by an amount in a range of from 100% to 500% beyond the original dimension. This provides the advantage of having a single collar grip able to accommodate virtually all commercial or stock camera lenses currently on the market.

In one embodiment, a collar grip has an unstretched interior diameter 6 in a range of from 1.0 inch (25.4 mm) to 5.0 inches (127 mm). In a further embodiment, a collar grip has an unstretched interior diameter in a range of from 2.0 inches (50.8 mm) to 4.0 inches (101.6 mm). In a further, the unstretched interior diameter of a collar grip is 3.0 inches (76.9 mm) or approximately 3 inches. In a specific embodiment, shown for example in FIG. 8, an unstretched interior diameter of a collar grip is approximately 3.03 inches or 76.93 mm.

In an embodiment, the interior diameter of a collar grip is substantially consistent from the first edge 12 to the second edge 14. Thus, the collar grip is not tapered or narrowed towards either edge. This allows it to be placed on a lens, such as a focusing ring, from either edge. It also allows the collar grip to be customized, discussed below, from either edge. The flexibility and elasticity of the material utilized for a collar grip will allow it to conform to the shape of a lens ring, even if the ring is tapered.

In addition to providing increased grasping and precision capabilities, a collar grip can have a material thickness 8, as depicted in FIGS. 1, 3, 6, and 9 as the distance between the exterior surface 2 and the interior surface 5. When a collar grip is installed over or around a stock collar, this thickness of the collar grip material can increase the distance between exterior surface, or where the collar grip is grasped by a user, and the center of the camera lens. This increased distance results in a larger amount of movement, or more degrees of rotation, to be required in order to generate the same change in the camera lens' focus and zoom as provided by the stock collar. In other words, a collar grip allows for greater rotational distance to achieve the same effect as the stock collar, allowing for smaller or incremental changes in the lens. It increases the error factor of the lens. This increased rotational distance (i.e., arc-distance) or degrees of rotation allows for more precise control over the focus and zoom of a camera lens. Thus, while the lens achieves the same adjustment in terms of distance turned by the stock collar, the use of a collar grip of embodiments of the subject invention would yield a lower change in terms of degrees of rotation as compared to using just the stock collar.

The thickness 8 of a collar grip 10 can be variable and depend upon a variety of factors known to those with skill in the art. The thickness of a collar grip can dictate the increased diameter that it affords to a stock collar when installed thereon. Likewise, the diameter of the stock collar around which a collar grip is placed can affect the resulting stretched thickness 9 of the collar grip. FIG. 7 shows the collar grip of FIG. 6 in a stretched configuration, showing the reduced thickness of the collar grip due to stretching. Smaller diameter stock collars may result in a thicker collar grip than a stock collar of larger diameter, with the same collar grip installed thereon. Conversely, a collar grip of greater thickness 8 can have a greater stretched thickness 9 on a larger diameter stock collar.

In one embodiment, the unstretched thickness 8 of a collar grip can be in a range of from 0.25 inch (6.35 mm) to 0.5 inch (12.7 mm). In a further embodiment, the unstretched thickness of a collar grip can be in a range of from 0.30 inch (7.6 mm) to 0.4 inch (10.2 mm). In a specific embodiment, the unstretched thickness of a collar grip is approximately 0.32 inch (8.18 mm).

A collar grip, as described above, can improve grasp of a stock collar and increase the precision with which a lens can be manipulated for focusing, zooming, or aperture control. The materials utilized can have sufficient pliability to allow the exterior surface 2 to conform to a user's fingers when grasped and can have sufficient stiction or cohesion to ensure a reliable grasp even with a light touch. Likewise, the interior surface 5 can conform to the configuration and any surface enhancing features, such as scoring or hatching, on a stock collar. The addition of extended surface features 20 on either or both the exterior surface and the interior surface of a collar grip can enhance cohesion and provide further surface area for increasing stiction. An extended surface feature can be any type of protrusion or raised material or object above the exterior surface or interior surface. The extended surface features can all be the same or have different sizes or shapes. An extended surface feature can be the same or a different material than that of the collar grip. The extended surface features can be arranged randomly, staggered, regularly, in a discernable pattern, or some combination thereof.

Figure 2:
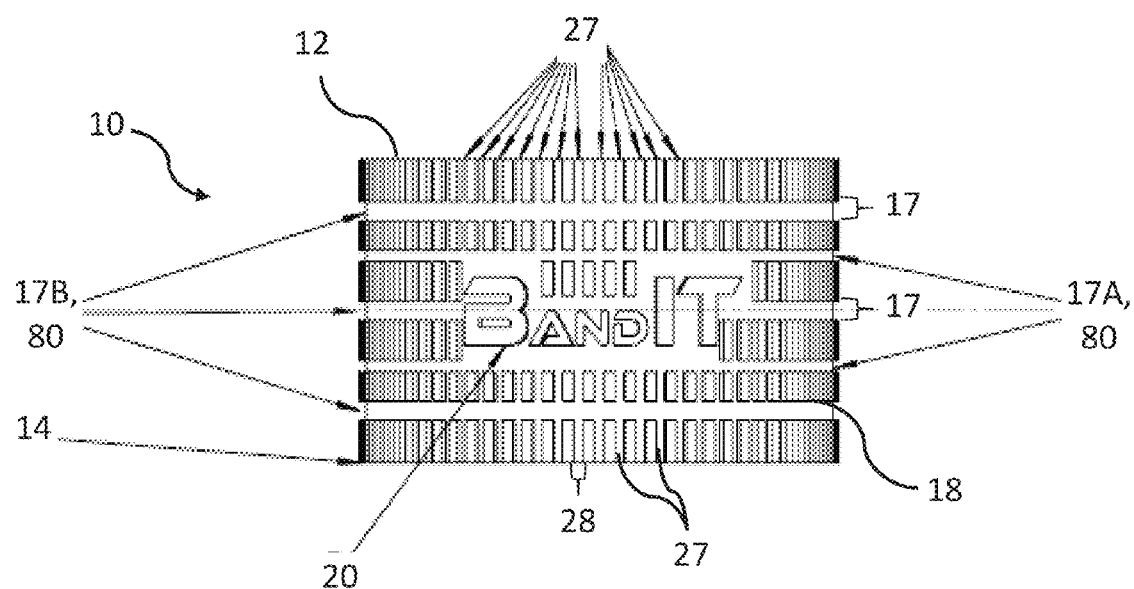
FIG. 2 is a side elevation view of an embodiment of the subject invention.
Figure 4:
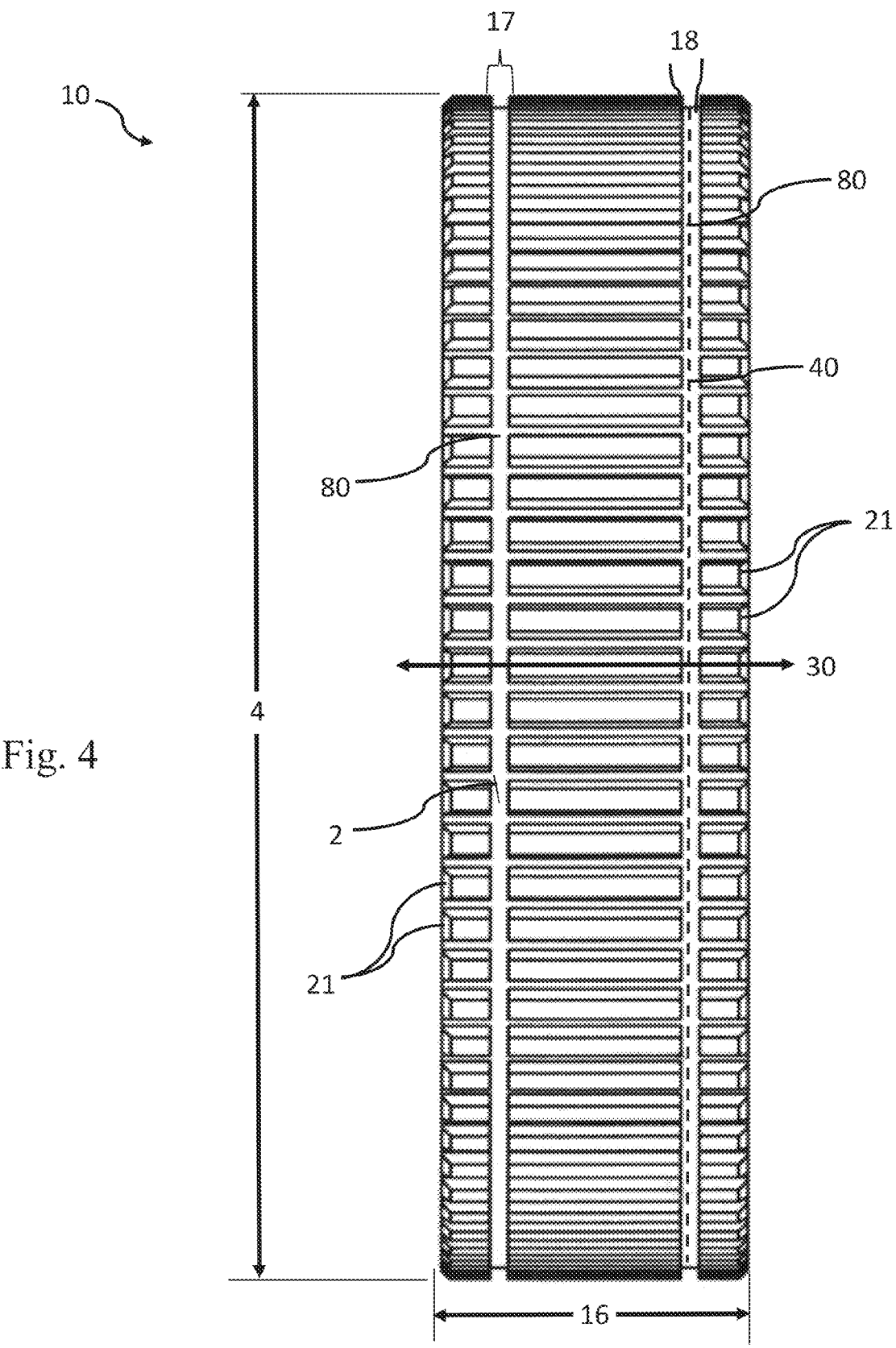
FIG. 4 is a side elevation view of an embodiment of the subject invention.
Figure 5:
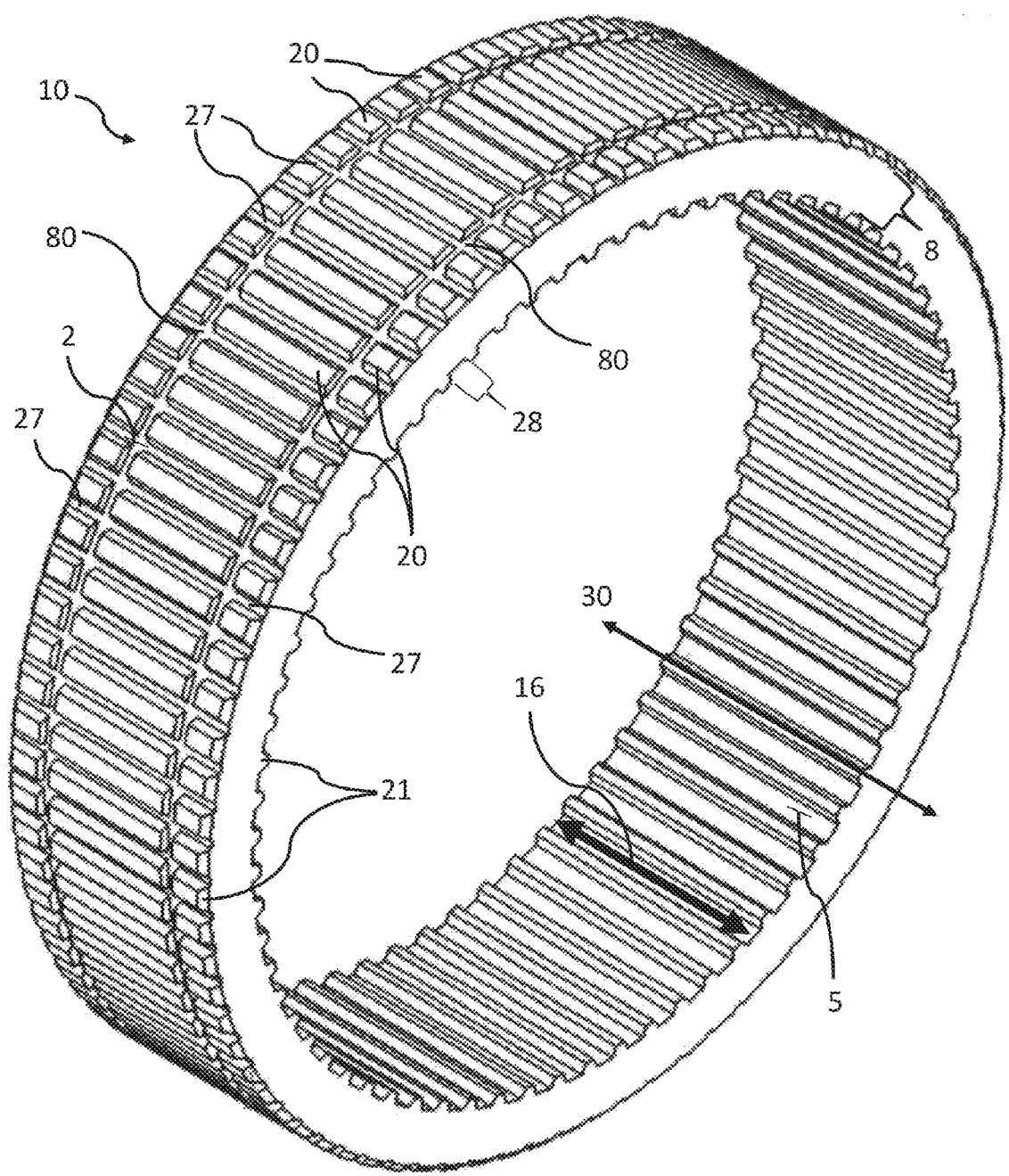
FIG. 5 is a perspective side elevation view of an embodiment of the subject invention.
Figure 7:
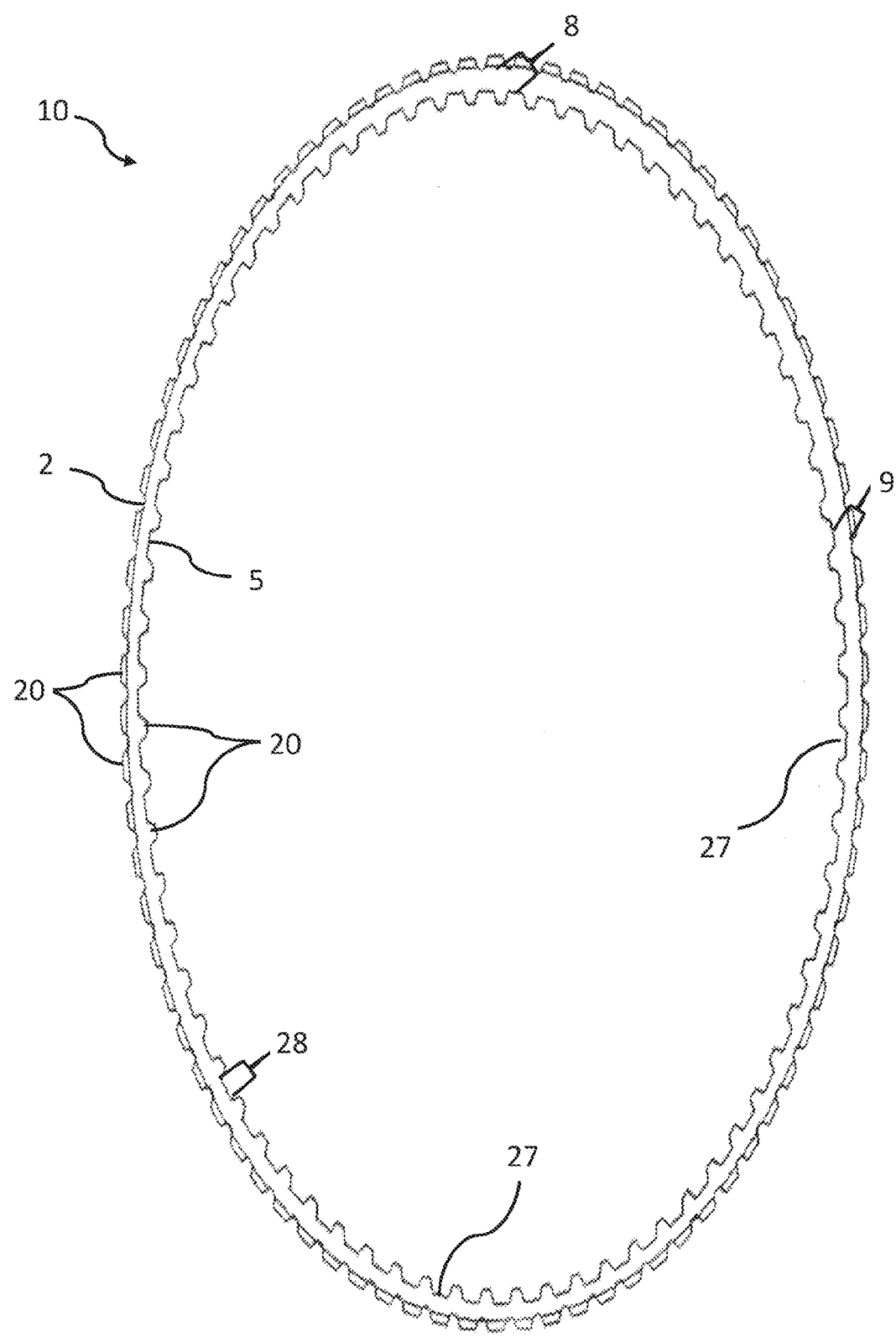
FIG. 7 is a front edge plan view of the embodiment shown in FIG. 6 in a stretched configuration.
Figure 8:
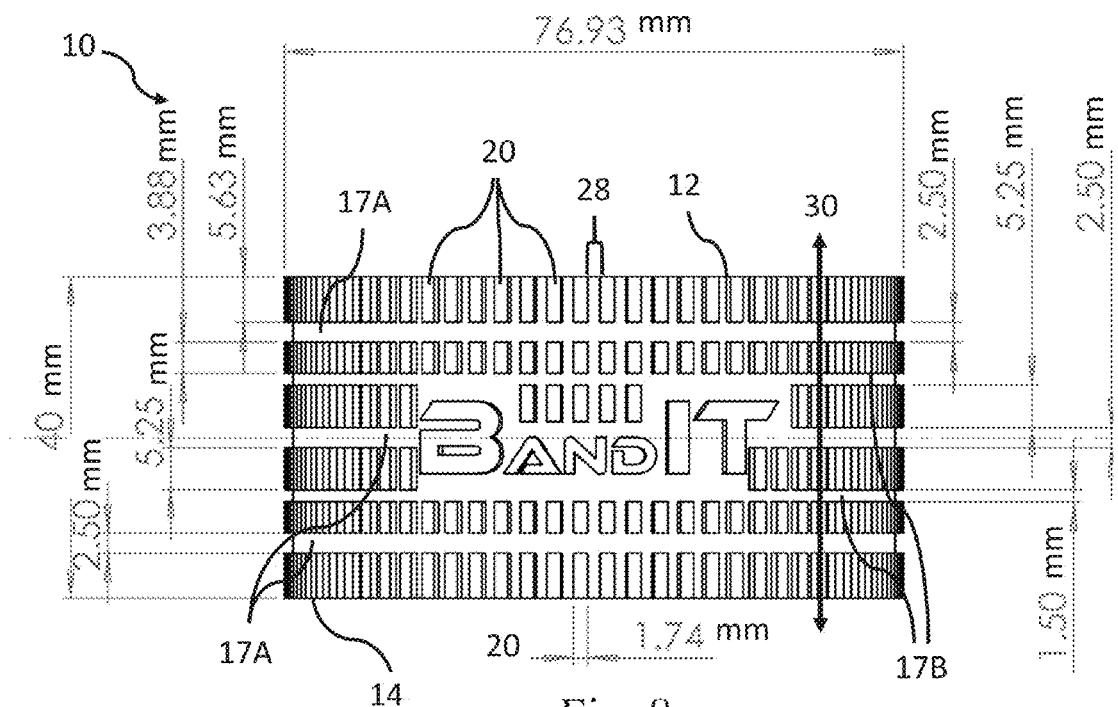
FIG. 8 is a side elevation view of an embodiment of the subject invention.
Figure 9:
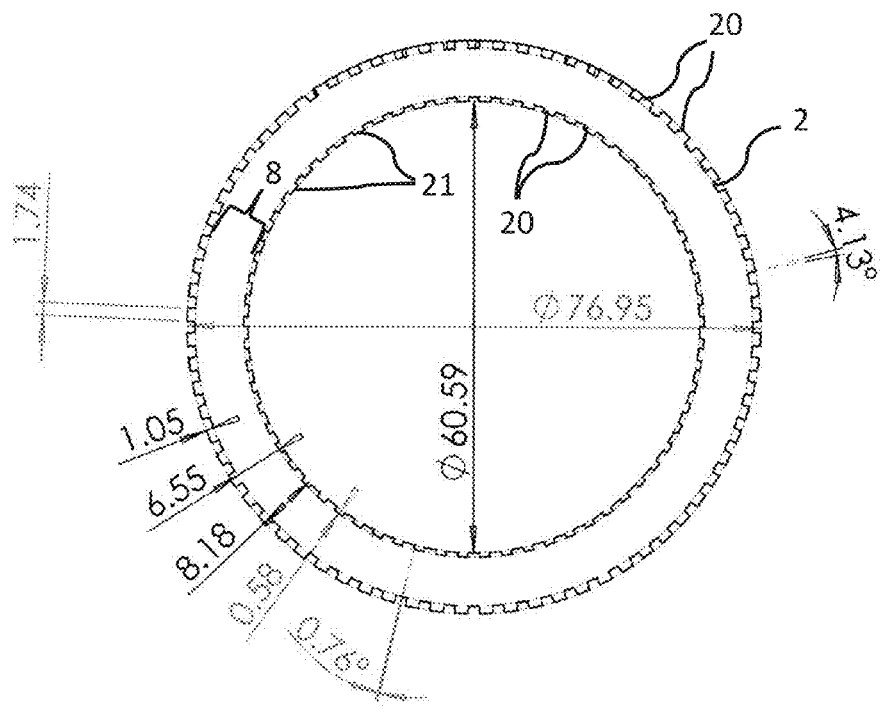
FIG. 9 is a front edge plan view of an embodiment of the subject invention.

In one embodiment, the exterior surface 2 has extended surface features 20. FIGS. 2, 4, and 8 illustrate non-limiting examples of extended surface features arranged in regular rows. In another embodiment, there are extended surface features 20 arranged around the interior surface 5 of the collar grip. In one embodiment, the extended surface features on the exterior surface are offset from or are otherwise not aligned with the extended surface features on the interior surface, an example of which is shown in FIGS. 1, 5, and 9. This can be advantageous when the collar grip is stretched, as shown in FIG. 7, as it can inhibit weak zones or areas where the material becomes thinner than other areas when stretched, which can potentially cause a break or tear in the collar grip. By offsetting the extended surface features on each surface, the thickness 8 of the material of the collar grip can maintain uniformity, or at least partial uniformity, when the collar grip is stretched.

Figure 10:
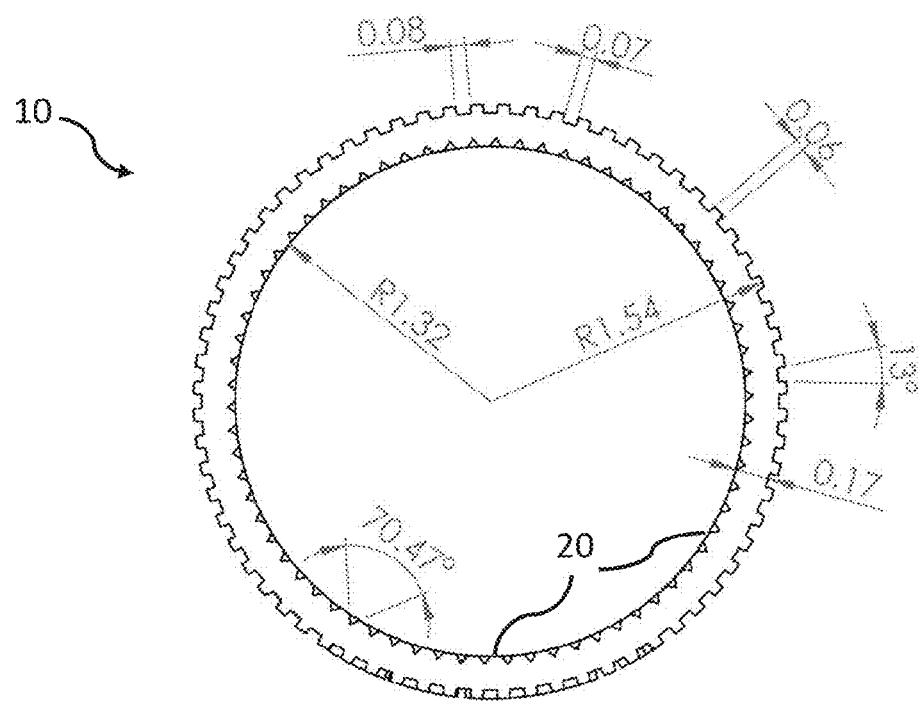
FIG. 10 is a front edge plan view of an alternative embodiment of the subject invention.
Figure 11:
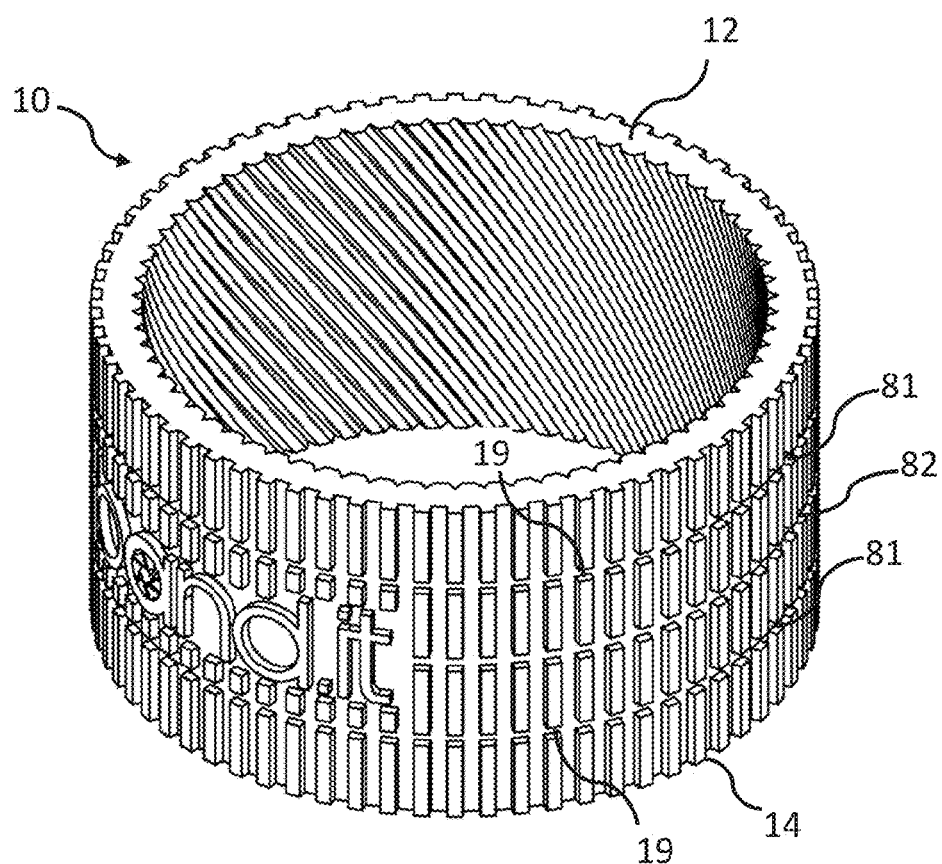
FIG. 11 is a front side perspective view of an alternative embodiment of the subject invention.

In one embodiment, the interior surface 5 has a plurality of regularly-arranged extended surface features 20. In one embodiment, the regularly-arranged extended surface features are configured as elongated ribs arranged between and transverse 30 to the first edge 12 and the second edge 14 of the collar grip 10, as illustrated in FIG. 5. In an alternative embodiment, the elongated ribs are arranged slanted or angled on the interior surface relative to the edges, one example of which is shown in FIGS. 10 and 11. This gives the ribs a "rifled" configuration that can be more effective at remaining in place on a lens barrel, depending upon the type of cross-hatching or other gripping features on the lens ring surface. With this embodiment, the ribs are angled across the interior surface between the edges, such that a rib is not transverse to either edge. In one embodiment, the ribs are angled or slanted on the interior surface between approximately 40° and approximately 60° relative to an edge. In a more particular embodiment, the ribs are angled between approximately 45° and 55°, relative to an edge.

Figure 3:
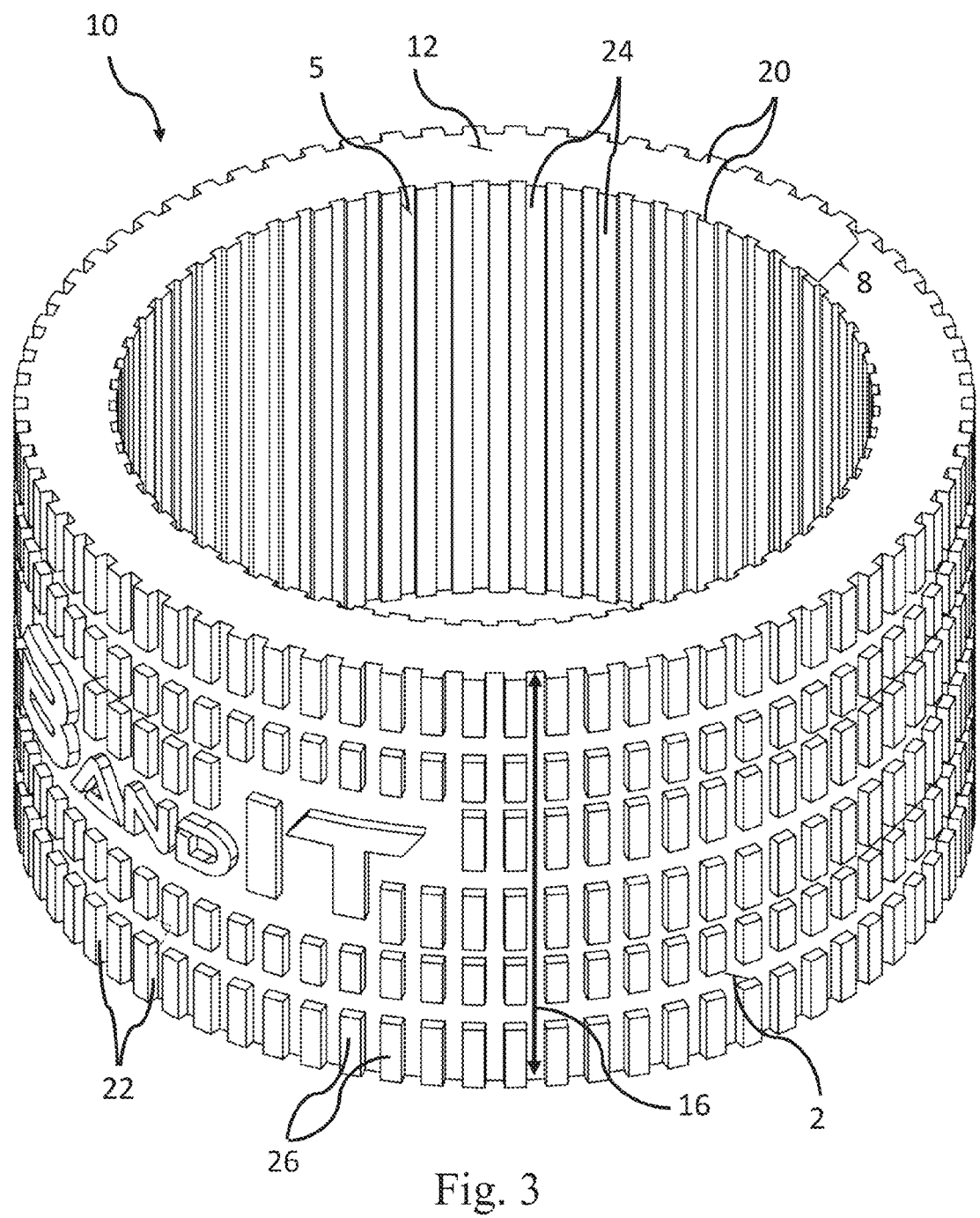
FIG. 3 is a perspective view from the front edge of an embodiment of the subject invention.
Figure 6:
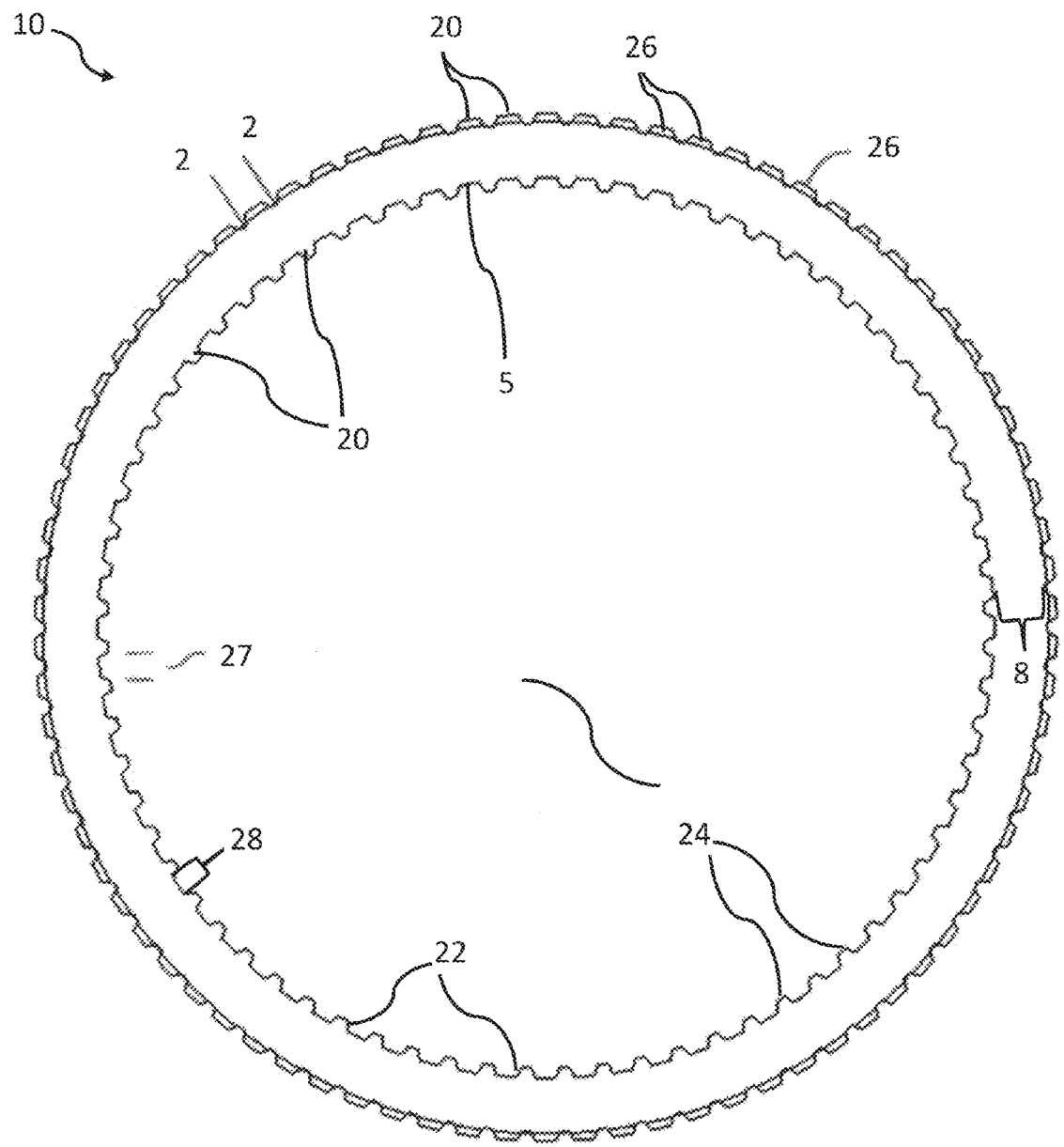
FIG. 6 is a front edge plan view of an embodiment of the subject invention.

The ribs can be arranged around all or most of the interior surface 5 of the collar grip, as shown, for example, in FIGS. 3, 5, and 6. In a further embodiment, the ribs can have faces 21 that extend to and are aligned with or are coplanar with at least one of the first edge 12 and the second edge 14 of the collar grip 10, which is shown, by way of example, in FIGS. 3 and 5.

Extended surface features 20, when present on the interior surface 5, are capable of securing the collar grip to a lens ring and ensuring minimal shifting or movement of the collar grip. Thus, the extended surface features can have dimensions that are suited to provide a sufficient amount of stiction or cohesion with a ring, such as a focusing ring, or any other part of a camera lens or lens barrel on which a collar grip is placed, without allowing the collar grip to shift, slip, rock, or otherwise move unnecessarily when used to manipulate a lens ring or if used to brace a lens or lens barrel. Many factors can dictate the dimensions of the extended surface features on a collar grip; for example, the type of material utilized, the shore rating of the material utilized, other dimensions of the collar grip, as well as other factors known to those with skill in the art.

In one embodiment, an extended surface feature 20 on the interior surface 5, such as ribs, rise between 0.2 mm (or approximately 0.2 mm) and 0.7 mm (or approximately 0.7 mm) above the interior surface 5. In a further embodiment, an extended surface feature rises between 0.4 mm (or approximately 0.4 mm) and 0.6 mm (or approximately 0.6 mm) above the interior surface. In a specific embodiment, shown for example, in FIG. 9, an extended surface feature rises approximately 0.58 mm above the interior surface.

Extended surfaces features on the interior surface 5 can also be spaced apart or have channels 27 therebetween, in order to maximize the amount of surface area available for contact, so as to create sufficient stiction. When a collar grip 10 is stretched, the extended surface features 20 on the interior surface and the channels can also stretch. An example of this is shown in FIG. 7, which shows a collar grip in an expanded state where it can be seen that the extended surface features on the interior surface and channels in between them are stretched and expanded when the collar grip is stretched and expanded. This can be advantageous when the collar grip is placed around a lens ring because when the collar grip is released around a lens ring and begins to retract, the material of the band can allow the surface of the collar grip and the extended surface features to settle around, enmesh with, or otherwise become interdigitated with surfaces of the lens ring. Thus, one or more sides 22 of the extended surface features, as well as the innermost faces 24 and the interior surface 5 in the channels 27 between the extended surface features, can all be engaged to hold the collar grip in place. If there are hatching, scoring, finger nobs, or other features on the stock collar, the ability of the collar grip 10 and all surfaces on the extended surface features to stretch or otherwise expand in surface area allows them to integrate with the stock collar and any features thereon when the collar grip retracts. This can further inhibit the collar grip from moving out of position once placed on a lens or around a stock collar or lens.

The distance by which the extended surface features on the interior surface are spaced apart, or the width 28 of the channels 27, as measured from where the extended surface features rise from the interior surface 5, can depend upon a variety of factors including, but not limited to, the type of material utilized for the collar grip, the dimensions of the collar grip, the diameter of the intended lens ring on which it is to be used, the shore rating of the material of the collar grip, and other factors known to those with skill in the art. In one embodiment, the channels 27 have a width 28 of between 0.5 mm and 2.0 mm. In further embodiment, channels have a width of between 0.7 mm and 1.5 mm. In a particular embodiment, channels have a width of about 1 mm.

In addition to being spaced apart by channels 27, one or more sides 22 of an extended surface feature on the interior surface 5 can be formed with a draft 26 or be angled in such a way that directs one or more sides of an extended surface feature 20 away from one or more sides or the innermost face of an adjacent extended surface feature. This can facilitate stretching of the extended surface features on the interior surface and can also ensure that the extended surface features don't rub against or abut each other, particularly their innermost faces 24. In one embodiment, one or more sides 22 of an extended surface feature have a draft of between 0.2° and 0.9°. In a more particular embodiment, an extended surface feature has one or more sides with a draft of between 0.5° and 0.8°. In a specific embodiment, shown by way of example in FIG. 9, an extended surface feature has at least one side with a draft of 0.76°.

A collar grip 10 can also have extended surface features 20 on the exterior surface 2, either alone or in addition to extended surface features on the interior surface 5. In one embodiment, the exterior surface 2 has a plurality of regularly-arranged extended surface features 20. In a further embodiment, the regularly-arranged extended surface features are configured as cogs arranged between the first edge 12 and the second edge 14 of a collar grip 10. The regularly-arranged cogs can be transversely aligned 30 relative to the first edge 12 and the second edge 14, examples of which are shown in FIGS. 4 and 8. Further, two or more cogs can be arranged side by side and transversely aligned relative to the first edge 12 and/or the second edge 14. Stated otherwise, cogs can be arranged in rows, where the rows of cogs are transversely aligned 30 to at least one of the first edge 12 and the second edge 14. Thus, an entire row of cogs is not required to, but can, extend from the first edge to the second edge and be transverse to either or both edges. One non-limiting example of this is shown in FIGS. 3 and 5, which show cogs having at least two planar sides 22 and an outward face 26, such that one planar side is next to a planar side of one or more adjacent cogs and the two or more aligned cogs are in rows that extend from the first edge 12 and the second edge 14 and are transversely aligned 30 with both edges, as illustrated in FIG. 3.

Extended surface features, such as cogs, can also be arranged around all or most of the exterior surface 2 of a collar grip, as shown, for example, in FIGS. 1, 6, and 9. FIGS. 2, 3, and 8 illustrate non-limiting alternative examples of collar grips 10 having cogs arranged around most of the exterior surface and where at least a portion of the exterior surface is reserved or used for a different type of cog or extended surface feature, which in this example, is lettering. In a still further embodiment, one or more cogs can be placed at or near to the first edge 12 or to the second edge 14 of the collar grip 10. In one embodiment, an extended surface feature 20 has at least one face 21 that is adjacent to or near an edge of the collar grip and where at least a portion of the face is beveled, so that it tilts or angles away from the edge 12 or 14 of the collar grip and directs towards the opposite edge. FIGS. 4 and 5 illustrate examples of this where cogs have a face 22 arranged at or near to one of the first edge 12 or the second edge 14 of the collar grip and that face has a draft that causes the face to lean away from the edge. In an embodiment, the edge can be, or can appear to be, beveled.

Extended surface features 20, when present on the exterior surface 5, should be capable of securing the collar grip to a lens ring and ensure minimal shifting or movement of the collar grip. Thus, the extended surface features should have dimensions suited for the purpose of maximizing stiction or cohesion with the user's fingers or hand and inhibit the band from shifting, slipping, rocking, or otherwise moving unnecessarily when manipulated. Many factors can dictate the dimensions of extended surface features on the exterior surface. For example, the type of material utilized, the shore rating of the material utilized, other dimensions of the collar grip, and other factors known to those with skill in the art.

In one embodiment, an extended surface feature on the exterior surface rises from 0.5 mm to 1.5 mm above the exterior surface 2. In a further embodiment, an extended surface feature rises from 0.7 mm to 1.2 mm above the interior surface. In a specific embodiment, shown, for example, in FIG. 9, an extended surface feature rises 1.05 mm above the interior surface.

Extended surfaces features can also be spaced apart by channels 27 in order to maximize the amount of surface area available for contact and to create sufficient stiction. When a collar grip 10 is stretched, the extended surface features 20 and channels on the exterior surface can also stretch. An example of this is shown in FIG. 7, which shows a collar grip in an expanded state and where it can be seen that the extended surface features and channels on the exterior surface are stretched and expanded when the collar grip is stretched and expanded. When the extended surface features are spaced apart, the amount of surface area available for contact, when the collar grip is stretched, can be increased. This can be advantageous when the collar grip is placed around a focusing, zoom or other lens ring because it can increase the amount of surface area contacted by the user and the irregularities caused by the extended surface features provide increased gripping capability and interdigitation with the fingers. Thus, the sides 22 of the extended surface features, as well as the outward faces 26 and the exterior surface 2 in the channels between the extended surface features can all be engaged by the user's fingers and prevent or inhibit slipping or sliding, even when wet.

The distance by which the extended surface features are spaced apart, as measured from where the extended surface features rise from the exterior surface, can depend upon a variety of factors including, but not limited to, the type of material utilized for the collar grip, the dimensions of the collar grip, the diameter of the intended ring on which it is to be used, the shore rating of the material of the collar grip, and other factors known to those with skill in the art.

In one embodiment, the extended surface features 20 on the exterior surface 2 have channels 27 between them spaced so as to permit finger contact with the sides 22 and outward faces 26 of the extended surface features. It can also be beneficial if the channels are spaced so that the sides 22 and outward faces 26 of the extended surface features are inhibited from abutting, overlapping, or otherwise touching when the collar grip is stretched and placed around a ring. In one embodiment, channels 27 have a width 28 in a range of from 1.0 mm to 2.0 mm. In further embodiment, channels have a width in a range of from 1.5 mm and 1.7 mm. In a particular embodiment, channels have a width of 1.74 mm. A specific embodiment of the subject invention has 72 channels arranged around the periphery of a collar grip.

To further increase finger contact with the collar grip 10, one or more sides 22 of an extended surface feature can be formed with a draft or at an angle that directs that side away from the side or innermost face of an adjacent extended surface feature. In one embodiment, one or more sides 22 of an extended surface feature have a draft of from 2° to 6°. In a further embodiment, an extended surface feature has one or more sides with a draft of from 3.5° to 5.5°. In a further embodiment, an extended surface feature has one or more sides with a draft of from 4° to 4.5°. In a specific embodiment, shown by way of example in FIG. 9, an extended surface feature has at least one side with a draft of 4.13°.

Lens rings, such as focusing lens rings or zoom lens rings, come in a variety of sizes and dimensions. In particular, they can have different heights, which is the distance between the edges of the focusing ring. The height defines the area where the fingers can be placed to manipulate the lens or lens barrel. As such, in many embodiments, it can be important that a collar grip have the same or similar height 16 as the stock collar on which it is placed. A collar grip that overhangs an edge of the lens ring can affect the motion of the lens, which affects the focusing and zooming capabilities or the aperture control. In one embodiment, a collar grip can have a height that is sufficiently small to fit on all or most known lens rings. This would allow a collar grip to be easily transferable between lenses, making it universally, or nearly universally, usable. If necessary, more than one collar grip can be placed around a stock collar to cover more area.

Alternatively, a collar grip can be customizable to fit a particular lens ring. A customized collar grip does not preclude it from being utilized on more than one ring. Customization allows a collar grip to be configured for a particular lens (or lens barrel) or several different lenses (or lens barrels) of similar heights 16. In one embodiment, the material utilized for a collar grip, in addition to being flexible, pliable, and stretchable, can also be sliced, cut, torn, ripped, or otherwise modified without adversely affecting the collar grip and the ability to place it around a lens ring. This can allow for a universally-sized collar grip or collar grips designed to work with different size ranges of focusing or zoom lenses. A collar grip can be modified to fit or work on a specific lens. In a further embodiment, material can be removed from one or both of the first edge 12 and the second edge 14 in order to change or customize the height 16 of the collar grip.

A collar grip can be customized by utilizing a device, such as, for example, scissors or a cutting blade, to remove unwanted material. Alternatively, a collar grip can have perforations 40 or rows of holes strategically placed around the periphery thereof. By using the perforations or rows of holes as a guide, material can be pulled or torn away from the collar grip. The perforations 40 or holes are placed close together so that material can be removed without leaving an undesirable frayed or irregular edge. This can provide the advantage of being able to customize in the field or when a cutting device is not available.

In another embodiment, to facilitate the removal of material from a collar grip 10, guides or tracks can be present around the periphery of the collar grip that can be followed when cutting away material. In certain embodiments, a collar grip, when resting with one edge against a horizontal surface, appears to have one or more horizontal tracks encircling the collar grip, which in one embodiment can be troughs, channels, or cut-outs around all or some portion of the periphery of a collar grip. FIGS. 2, 4, and 5 illustrate non-limiting examples of these types of horizontal tracks 80, within the surface of a collar grip and which extend around the entire periphery. In addition to providing guidance when cutting or removing material from a collar grip, the horizontal tracks can allow for thermal expansion and contraction of the material. An alternative embodiment of horizontal tracks 80 can extend intermittently or periodically around the collar grip. FIG. 8 shows one example of horizontal tracks that stop where the lettering begins, and start again further around the collar grip.

Depending upon the arrangement of any extended surface features 20 that may be on the exterior surface 2, horizontal tracks may be located between or can appear to go through one or more extended surface features. FIGS. 2, 4, and 5 illustrate one embodiment of a collar grip having extended surface features in the form of cogs. In these embodiments, the cogs are arranged in a uniform linear fashion so that a horizontal track can run between the cogs. Alternatively, the horizontal track can appear to transect multiple cogs as it goes around the collar grip. Horizontal tracks can act as guidelines for lens owners that would like to customize the size of the collar grip to their personal lenses or lens barrels. A cutting device can be used within the horizontal tracks to cut the material more easily due to the decreased thickness and more accurately because they can follow the path provided by the horizontal track.

There can be more than one horizontal track 80 arranged at varying distances from one or more of the edges of a collar grip. In one embodiment, shown for example in FIGS. 4 and 5, two horizontal tracks can be present. The horizontal tracks can each be located nearer to an edge of the collar grip than they are to each other. In an alternative embodiment, the two tracks can be evenly or regularly spaced relative to the edges 12 and 14 of the collar grip. In another embodiment, shown for example in FIGS. 2, 3, and 8 several horizontal tracks can be arranged on a collar grip. They can be arranged at varying distances or they can be evenly or regularly spaced, relative to the edges 12 and 14 of the collar grip. A user can accurately trim away excess material from one or both edges to achieve the desired height 16.

The width 17 of a horizontal track 80 is the distance between the sides 18, as depicted in FIGS. 4 and 8. The width can also vary depending upon the number of horizontal tracks, their location on the collar grip, any extended surface features, and other factors known to those with skill in the art. Further, where more than one horizontal track is present, they do not have to have the same width. In one embodiment, the width 17 of a horizontal track is in a range of from 1.0 mm to 4.0 mm. In a further embodiment, the width of a horizontal track is in a range of from 1.25 mm to 3.25 mm. In a further embodiment, the width of a horizontal track is in a range of from 1.5 mm to 3.0 mm. In yet a further embodiment, the width of a horizontal track is in a range of from 1.5 mm to 2.5 mm.

In one embodiment, a collar grip has five horizontal tracks 80, an example of which is shown in FIG. 8. Three of the horizontal tracks can have a larger width than the two other horizontal tracks. The three larger width horizontal tracks 17A are arranged with two outermost horizontal tracks being nearest to the first edge 12 and the second edge 14, respectively, and the third of these horizontal tracks being generally centered between the first and second edges. In one embodiment, these three horizontal tracks have the same thickness. In a particular embodiment, the three larger width horizontal tracks have a width of 2.5 mm or about 2.5 mm. There can also be a set of thinner width horizontal tracks 17B, with each one of the set arranged on either side of a larger width horizontal track 17A centered on the collar grip. In one embodiment, the thinner width horizontal tracks each have a width of 1.5 mm or about 1.5 mm.

The concept of varying the width of horizontal tracks was developed through an in-depth study of photographers and their habits in the field when adjusting the zoom and focus of their lenses. It was found that statistically, photographers grip the focusing ring on a camera lens barrel more often on the edges and centerline than other areas of the focusing ring. Widening some tracks (e.g., to 2.5 millimeters) can allow photographers to achieve more texture and grip with the lens in the most used areas. Typically, photographers manipulate the lenses of a camera by touch. They are usually looking through the camera viewfinder while making adjustments to the lenses, in order to achieve the desired image or effect. So, they learn to feel for the features and controls on a lens barrel, without taking their eye away from the viewfinder. Advantageously, the number of tracks and the width of the tracks 80 on a collar grip 10 can be a tactile aid to a photographer. By learning the feel of the tracks, they can discern the position of a lens, location of controls on a lens, the amount of lens extension, and other characteristics of a lens by the location of the tracks.

Figure 12:
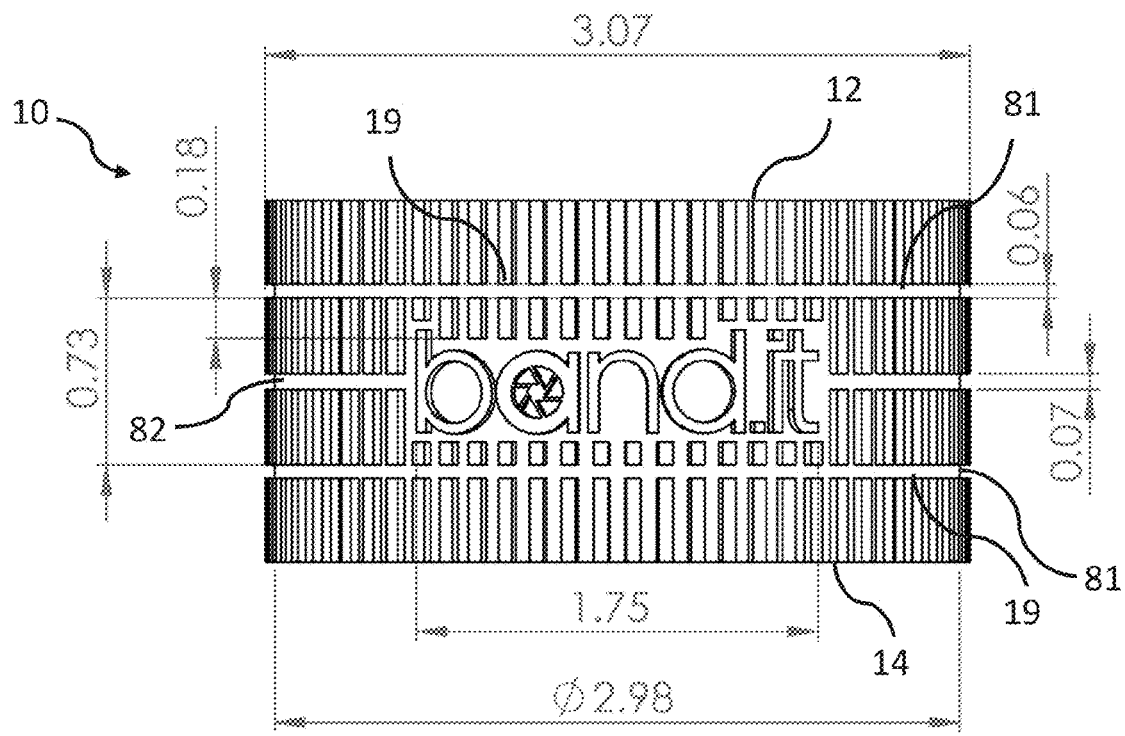
FIG. 12 is a side elevation view of an alternative embodiment of the subject invention.
Figure 13:
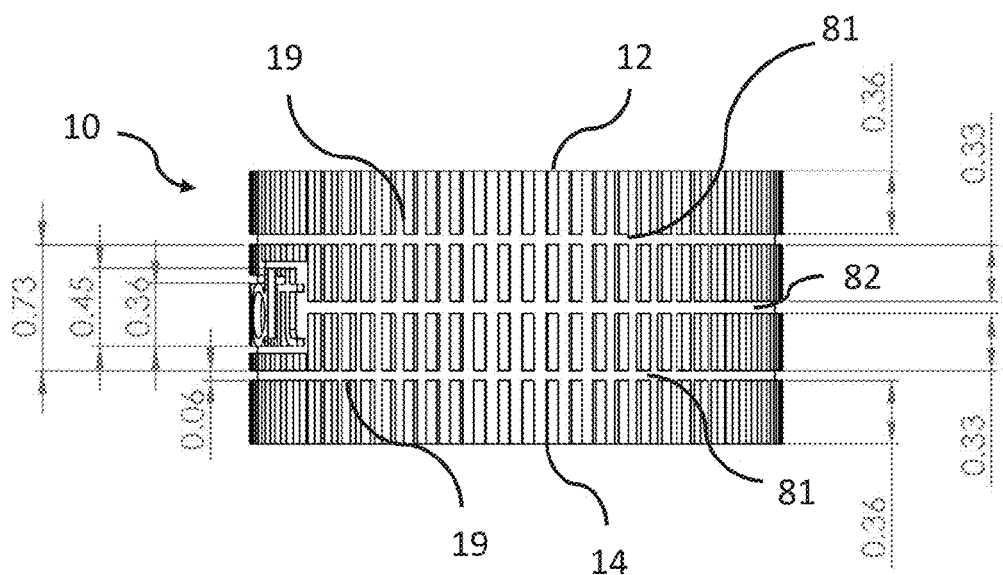
FIG. 13 is a side elevation view of an alternative embodiment of the subject invention.

In a particular embodiment, shown, for example, in FIGS. 11, 12, and 13, there can be three tracks 80 extending around the periphery of a collar grip 10. The two outermost tracks can have a width 17 that is less than the width of the center track, as shown in FIG. 12. This difference in widths can be tactile indicator. The tracks can also be spaced around the periphery, where the distance between the tracks is less than the distance from an edge 12 or 14 to an outermost track, which is shown, for example, in FIG. 12. This difference in distance between the tracks and the tracks and the edge of the collar grip can also be a tactile indicator.

In a specific embodiment, illustrated in FIGS. 12 and 13, the outer tracks 81 closest to the collar grip edges 12 and 14 are approximately 0.06" in width and the center track 82 is approximately 0.07" in width. In a further specific embodiment, the outer tracks 81 are approximately 0.36" from the respective edges 12 and 14 of the collar grip, as measured from the edge of the collar grip to the outermost sidewall 19 of the track. In yet a further specific embodiment, the distance between each outer track 81 and the center track 82 is approximately 0.33". Thus, in this specific embodiment, the three tracks are evenly spaced from each other and are slightly closer to the center of the collar grip. This configuration of different size horizontal tracks and their placement on the collar grip distanced slightly from the edges can be used as a tactile indicator of where a lens ring is located relative to the body of the camera.

The accuracy with which a camera lens can be zoomed and focused is dependent upon the skill of the photographer and the sensitivity of the equipment, particularly the lens of the camera. The focusing and zoom rings on most camera lenses, as well as the aperture control ring, often lack adequate stiction or traction to allow a photographer to gain a secure grip. Collar grips of embodiments of the subject invention can be easily placed around a ring to provide the stiction and grip that most photographers require for accurate manipulation of a lens. Collar grips of embodiments of the subject invention also provide other advantages such as increasing the diameter to the focusing ring, customization, and protection for the lens.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

What is claimed is:

1. A collar grip adapted to be placed on a lens ring on a camera lens barrel, the collar grip comprising:
   a stretchable tubular sleeve having a first edge and a second edge that define a height of the collar grip therebetween;
   an exterior surface between the first edge and the second edge, the exterior surface having a plurality of exterior extended surface features, and at least one channel provided between adjacent exterior extended surface features;
   an interior surface between the first edge and the second edge and opposite to the exterior surface, having a plurality of interior extended surface features and at least one channel provided between adjacent interior extended surface features; and
   one or more horizontal tracks on the exterior surface,
   wherein each horizontal track has a width and circumscribes the exterior surface of the tubular sleeve, and
   wherein the collar grip has a durometer in a range of 5 to 60.

2. The collar grip according to claim 1, wherein the extended surface features on the interior surface extend between the first edge to the second edge and are transverse to at least one of the first edge and the second edge.

3. The collar grip according to claim 1, wherein the extended surface features on the interior surface extend between the first edge to the second edge and are slanted relative to the first edge and the second edge.

4. The collar grip according to claim 1, wherein the collar grip is made of a silicone polymer material.

5. The collar grip according to claim 4, wherein the silicone polymer is platinum-catalyzed.

6. The collar grip according to claim 1, wherein the exterior extended surface features are cogs.

7. The collar grip according to claim 6, wherein the interior extended surface features are ribs.

8. The collar grip according to claim 6, comprising at least two horizontal tracks having the same width.

9. The collar grip according to claim 1, wherein each exterior extended surface feature has a face that is adjacent to at least one of the first edge and the second edge.

10. The collar grip according to claim 9, wherein at least a portion of the face has a draft that causes it to tilt away from the adjacent edge.

11. A collar grip adapted to be placed on a lens ring on a camera lens barrel, the collar grip comprising:
   a stretchable tubular sleeve having a first edge and a second edge that define a height of the collar grip therebetween;
   an exterior surface between the first edge and the second edge, the exterior surface having a plurality of exterior extended surface features, and at least one channel provided between adjacent exterior extended surface features;
   an interior surface between the first edge and the second edge and opposite to the exterior surface, having a plurality of interior extended surface features and at least one channel provided between adjacent interior extended surface features; and
   one or more horizontal tracks on the exterior surface,
   wherein each horizontal track has a width and circumscribes the exterior surface of the tubular sleeve,
   wherein the extended surface features on the interior surface extend between the first edge to the second edge and are slanted relative to the first edge and the second edge, and
   wherein the extended surface features are slanted at an angle between approximately 40° and approximately 60° relative to an edge.

12. The collar grip according to claim 11, wherein the extended surface features are slanted at an angle between approximately 45° and 55°.

13. A collar grip adapted to be placed on a lens ring on a camera lens barrel, the collar grip comprising:
   a stretchable tubular sleeve having a first edge and a second edge that define a height of the collar grip therebetween;
   an exterior surface between the first edge and the second edge, the exterior surface having a plurality of exterior extended surface features, and at least one channel provided between adjacent exterior extended surface features;
   an interior surface between the first edge and the second edge and opposite to the exterior surface, having a plurality of interior extended surface features and at least one channel provided between adjacent interior extended surface features; and
   one or more horizontal tracks on the exterior surface,
   wherein each horizontal track has a width and circumscribes the exterior surface of the tubular sleeve,
   wherein the collar grip is made of a silicone polymer material, and
   wherein the silicone polymer is platinum-based.

14. A collar grip adapted to be placed on a lens ring on a camera lens barrel, the collar grip comprising:
   a stretchable tubular sleeve having a first edge and a second edge that define a height of the collar grip therebetween;
   an exterior surface between the first edge and the second edge, the exterior surface having a plurality of exterior extended surface features, and at least one channel provided between adjacent exterior extended surface features;
   an interior surface between the first edge and the second edge and opposite to the exterior surface, having a plurality of interior extended surface features and at least one channel provided between adjacent interior extended surface features; and
   one or more horizontal tracks on the exterior surface,
   wherein each horizontal track has a width and circumscribes the exterior surface of the tubular sleeve,
   wherein the exterior extended surface features are cogs, and
   wherein the one or more horizontal tracks comprises at least two horizontal tracks having different widths.

15. A collar grip adapted to be placed on a lens ring on a camera lens barrel, the collar grip comprising:

a stretchable tubular sleeve having a first edge and a second edge that define a height of the collar grip therebetween;
an exterior surface between the first edge and the second edge, the exterior surface having a plurality of exterior extended surface features, and at least one channel provided between adjacent exterior extended surface features;
an interior surface between the first edge and the second edge and opposite to the exterior surface, having a plurality of interior extended surface features and at least one channel provided between adjacent interior extended surface features; and
one or more horizontal tracks on the exterior surface,
wherein each horizontal track has a width and circumscribes the exterior surface of the tubular sleeve,
wherein the exterior extended surface features are cogs, and
wherein the one or more horizontal tracks comprises three horizontal tracks spaced apart on the exterior surface, including a first horizontal track that is centered on the exterior surface, and
wherein at least two of the horizontal tracks have different widths from each other.

16. The collar grip according to claim 15, wherein the at least three horizontal tracks further include:
a second horizontal track on one side of the first horizontal track; and
a third horizontal track on the other side of the first horizontal track,
wherein the width of the second horizontal track is narrower than that of the first horizontal track, and
wherein the width of the third horizontal track is narrower than that of the first horizontal track.

* * * * *